Figure 1:
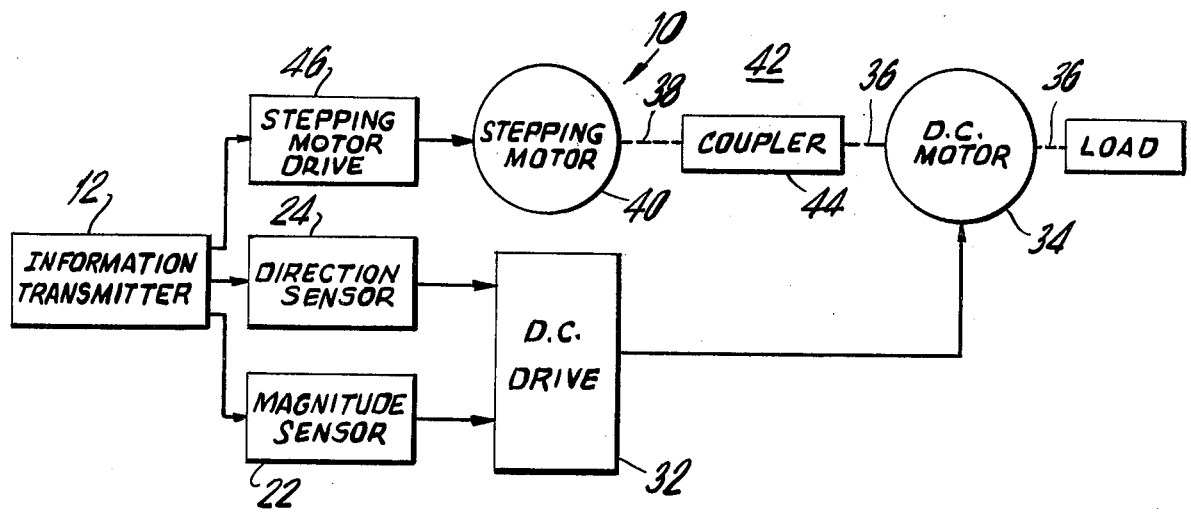

United States Patent [19]
Morino et al.

[11] 3,940,677
[45] Feb. 24, 1976

[54] DIRECT-CURRENT STEPPING MOTOR DRIVE SYSTEM

[75] Inventors: Ronald Morino, Sea Cliff; William B. Tucker, East Norwich; Raymond J. Keogh, Huntington, all of N.Y.

[73] Assignee: Photocircuits Division of Kollmorgen Corporation, Hartford, Conn.

[22] Filed: Nov. 6, 1973

[21] Appl. No.: 413,334

[52] U.S. Cl. .................. 318/685; 318/46; 318/8; 318/625
[51] Int. Cl.² ............... G05B 11/32; G05B 19/40; H02K 17/34
[58] Field of Search ....... 318/685, 696, 45, 46, 47, 318/8, 611, 625

[56] References Cited
UNITED STATES PATENTS

| | | | |
|---|---|---|---|
| 1,818,330 | 8/1931 | Horni | 318/47 |
| 2,652,919 | 9/1953 | Jochem | 318/45 |
| 2,941,136 | 6/1960 | Marantette et al. | 318/685 |
| 3,379,945 | 4/1968 | Mitchell et al. | 318/46 |
| 3,497,778 | 2/1970 | Gerber | 318/685 |

*Primary Examiner*—Robert K. Schaefer
*Assistant Examiner*—John J. Feldhaus
*Attorney, Agent, or Firm*—Morgan, Finnegan, Pine, Foley & Lee

[57] ABSTRACT

A motor drive system including a direct-current motor arranged in tandem with a stepping motor. The stepping motor is energized by conventional means. The direct-current motor is energized by a constant-current drive means, which is responsive to signals from magnitude and direction sensing means. The direct-current motor and stepping motor coact to provide a controlled mechanical output.

7 Claims, 2 Drawing Figures

DIRECT-CURRENT STEPPING MOTOR DRIVE SYSTEM

This invention relates to motor drive systems, and more specifically to a stepping motor drive system.

A numerical-control drive system is a system in which desired mechanical operations are performed and controlled automatically as a function of an electronic, numerical input. The input may take the permanent form of a punched tape, punched cards, magnetic tape, or may take the temporary form of a decade switch. The desired mechanical output may be achieved by electrical, hydraulic, or pneumatic drives.

Numerical-control drive systems have been utilized, particularly in the area of feed-drive control systems, for numerically-controlled machine tools, which use a stepping motor drive. A stepping motor drive allows simplicity of construction, relatively low cost, and reliable action with simple open-loop control (when used within the ratings of the stepping motor).

However, the utility of a stepping motor drive system has been found to be severely limited in applications for which the stepping motor is not rated. Stepping motors which are required to drive a relatively high inertial load have been unable to start reliably except at low stepping rates. Furthermore, in achieving somewhat higher-than-rated stepping rates, careful programming has been necessitated. Experience indicates that, under conditions of relatively high inertial loads or high stepping rates, the stepping motor will either stall or otherwise fail to perform adequately.

This invention removes the inadequacies of the stepping motor drive system while incorporating its advantages, by arranging a direct-current motor in tandem with the stepping motor.

In this combination motor arrangement, the direct-current motor supplies a torque boost to the stepping motor which permits the stepping motor to step at a greatly increased rate, without the normal inhibitions due to a relatively high inertial load. The inherent reliability and ability of the stepping motor to hold its position between commands remains unaffected by the tandem arrangement.

The drive system of the present invention possesses the reliability of a conventional stepping motor drive system, as well as the high-speed, high-torque, high-response characteristics of a direct-current motor drive system. The combination direct-current motor and stepping motor drive can reliably respond over a relatively extensive range of required speeds and required torques.

Figure 2:
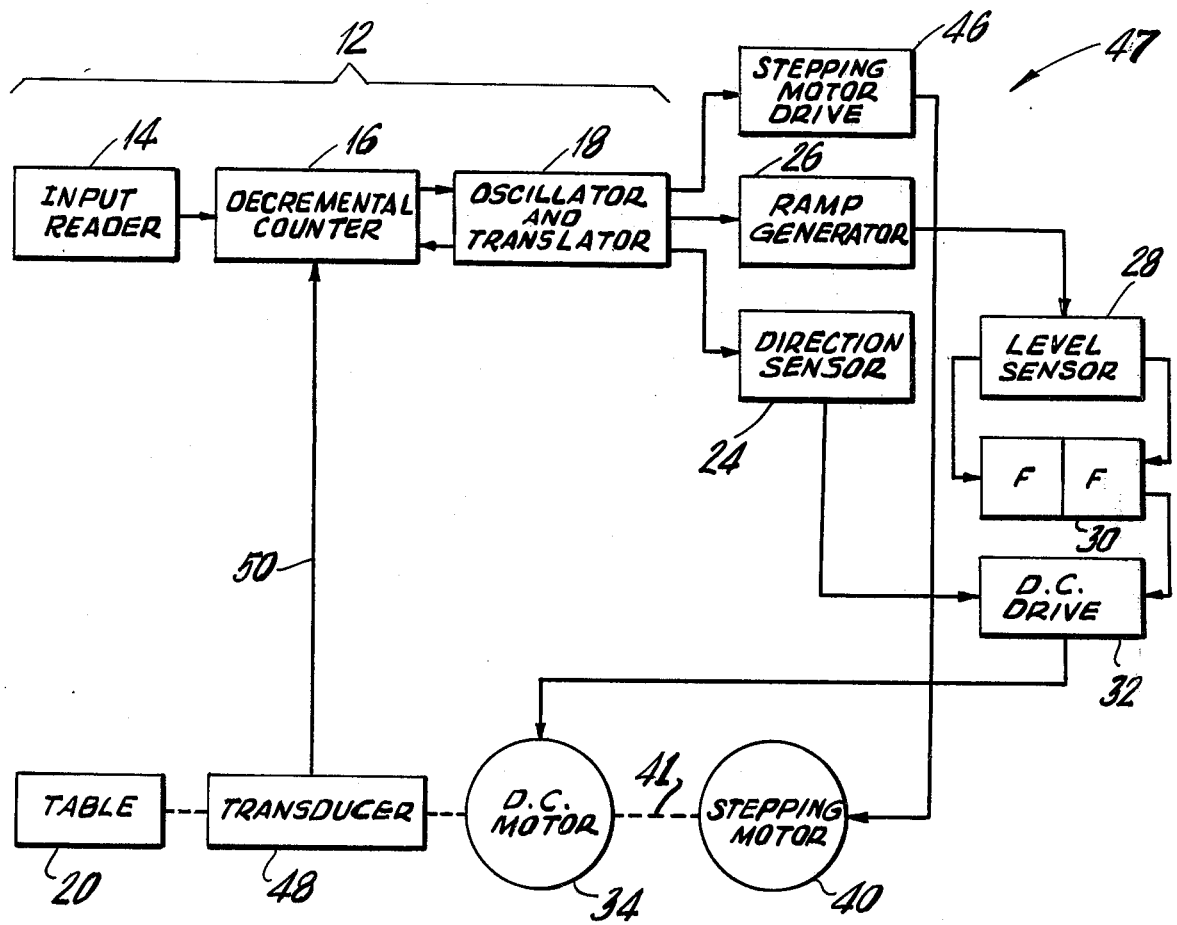

The present invention is illustrated in the accompanying drawing, in which:

FIG. 1 is a block diagram showing the direct current motor and stepping motor drive employed in a numerical-control drive system; and FIG. 2 is a block diagram showing the direct current motor and stepping motor drive with a modified numerical-control drive system.

Referring to FIG. 1, the numerical motor drive control system generally indicated at 10 includes means for transmitting information 12, which in FIG. 2 comprises an input reader 14, a decremental counter 16, and an oscillator and translator 18. The information transmitting means 12 produces automatically controlled signals, e.g., from a magnetic tape, which indicate electrically, a mechanical operation to be performed by the system, such as, the raising and lowering of a tool-carrying table 20, in an accurate, controlled fashion.

The signals from the information transmitting means 12 are coupled to two sensing devices which indicate electrically the required speed and direction of the table 20. These sensing devices are referred to as the magnitude-sensing means 22 and the direction-sensing means 24, respectively. The magnitude-sensing means 22 indicates, in the form of a voltage signal, the rate at which the tool-carrying table 20 is to travel. As shown in FIG. 2, the magnitude-sensing means 22 is comprised of a ramp generator means 26, a level-sensing means 28, and a flip-flop 30.

The magnitude-sensing means 22 and the direction-sensing means 24 provide input signals to a constant current d.c. drive 32. Direct current drive 32 energizes a highly responsive, moving-coil direct-current motor 34 causing the shaft 36 to rotate with a constant torque. Shaft 36 is mechanically attached to a load such as the tool-carrying table 20 in FIG. 2. The direct-current motor shaft 36 is also coupled to the shaft 38 of the stepping-motor 40, so that the rotation and torque present on either shaft will be transmitted to the other shaft. The shafts 36 and 38 represent the end sections of a single shaft 42 coupled together by middle section or coupler 44. The coupler 44 locks the shafts 36 and 38 together for dependent rotation.

The signals transmitted by the information transmitting means 12 are also transmitted to a stepping motor drive 46 and then applied to the stepping motor 40.

The information transmitting means 12 simultaneously transmits automatically controlled signals to the constant current direct-current drive 32 to control the torque of the direct-current motor 34, and to the stepping-motor drive 46 to provide controlled rotation of the shaft 38 of the stepping motor 40. (The stepping motor may be of the type disclosed in U.S. Pat. No. 2,931,929, Snowdon et al.).

The numerical control drive system 10 shown in FIG. 1 does not utilize closed-loop feedback between the mechanical output of the system and the electrical input. The reliability of the stepping motor 40 makes open-loop operation practicable.

FIG. 2 illustrates a numerical control drive system 47 in closed-loop form. The closed-loop serves to verify that the system 47 is operating properly. Transducer 48 converts the mechanical output of shaft 36 into an electrical signal which is transmitted by lead 50 to the decremental counter 16. In the decremental counter 16, the number of mechanical rotations completed are compared with the number of rotations the information transmitting means 12 has commanded to be performed.

Referring to FIG. 2, reader 14 reads from a punched tape, magnetic tape, or the like, a program corresponding to the number of steps required to perform a desired mechanical operation. The number of steps is temporarily stored in counter 16. The number is thereafter decremented as counter 16 communicates a series of pulses to the oscillator and translator 18. The pulses correspond to incremental displacements desired at the output. From the oscillator and translator 18, automatically-controlled signals are fed simultaneously to the stepping motor drive 46, direction sensor 24, and ramp generator 26. The signals transmitted to the stepping motor drive 46 control the stepping movement of the common shaft 41. The signals transmitted to the direction sensor 24 control the direction of rotation of shaft 41, preventing improper reversal of the shaft 41 by maintaining the proper polarity on direct current drive 32. The signals transmitted to the ramp generator 26 are accumulated and summed in the form of a ramp voltage. The voltage level of the ramp is measured by the level sensor 28 which triggers flip-flop 30 when a predetermined level is sensed. The output signal from the flip-flop 30 is fed by means of the constant current direct-current drive 32 to the direct-current motor 34 to provide a torque boost to the common shaft 41.

As the direct-current motor 34 is driven by the signals emanating from flip-flop 30, stepping motor 40 will step at a higher rate with an added torque boost. Transducer 48, which may be optical, magnetic, or of such similar nature, serves to verify that the proper number of incremental steps have been made.

It should be understood by those skilled in the art that various modifications may be made in the present invention without departing from the spirit and scope thereof, as described in the specification and defined in the appended claims.

What is claimed is:

1. A drive system for developing a controlled mechanical output, comprising:
    a stepping motor having a shaft which is rotatable in response to a first input signal means;
    a direct-current motor having a shaft which is rotatable at constant torque in response to a second input signal means;
    coupling means for directly coupling said shaft of said stepping motor and said shaft of said direct-current motor in tandem as a single shaft, said single shaft undergoing rotation in response to output signals from said first and said second input signal means to provide a controlled mechanical output.

2. A drive system as claimed in claim 1 wherein:
    said direct-current motor is a highly responsive, moving-coil direct-current motor.

3. A drive control system as claimed in claim 1 including:
    transducer means for generating signals in response to the controlled mechanical output from said motors, said transducer means being electrically coupled to said first and second input signal means.

4. A drive control system as claimed in claim 1 wherein:
    said input signal means to said direct-current motor includes information transmitting means, direction sensor means, magnitude sensor means, and a constant current direct-current drive means, said information transmitting means being coupled to said direction and magnitude sensor means, said direction and magnitude sensor means being electrically connected to said constant current direct-current drive means, and said constant current direct-current drive means being electrically connected to said direct-current motor;
    said input signal means to said stepping motor includes said information transmitting means and stepping motor drive means, said information transmitting means being electrically connected to said stepping motor drive means and said stepping motor drive means being electrically connected to said stepping motor.

5. A drive system for developing a controlled mechanical output, comprising:
    a stepping motor operable in response to a first input signal means;
    said first input signal means to said stepping motor including an information transmitting means and stepping motor drive means, said information transmitting means being electrically connected to said stepping motor drive means and said stepping motor drive means being electrically connected to said stepping motor;
    a direct-current motor connected in tandem with said stepping motor and operable in response to a second input signal means;
    said second input signal means to said direct-current motor including said information transmitting means, direction sensor means, magnitude sensor means, and a constant current direct-current drive means, said information transmitting means being coupled to said direction and magnitude sensor means, said magnitude sensor means including a ramp generator means for accumulating and summing the magnitudes of the signals from said information transmitting means to form a ramp voltage, level sensor means connected to said ramp generator means for measuring the level of the ramp voltage to provide an output signal when a predetermined voltage level is sensed, and a flip-flop connected to said level sensor for generating an output in response to a signal from said level sensor means, said direction and magnitude sensor means being electrically connected to said constant current direct-current drive means, and said constant current direct-current drive means being electrically connected to said direct-current motor;
    said stepping motor and said direct-current motor coacting to provide a controlled mechanical output.

6. A drive control system as claimed in claim 5 wherein:
    said information transmitting means includes input reader means, decremental counter means coupled to said input reader means, and oscillator and translator means electrically connected to said decremental counter means.

7. A drive control system as claimed in claim 6 including:
    a feedback loop having a transducer which converts the controlled mechanical output into electrical signals and transmits the electrical signals to said decremental counter means to verify that the mechanical output of the system corresponds to the output signals from said decremental counter.

* * * * *